Jan. 10, 1950
D. NASSIF
2,494,448
MACHINE FOR COOKING SKEWERED FOODS
Filed Feb. 3, 1945
2 Sheets-Sheet 1
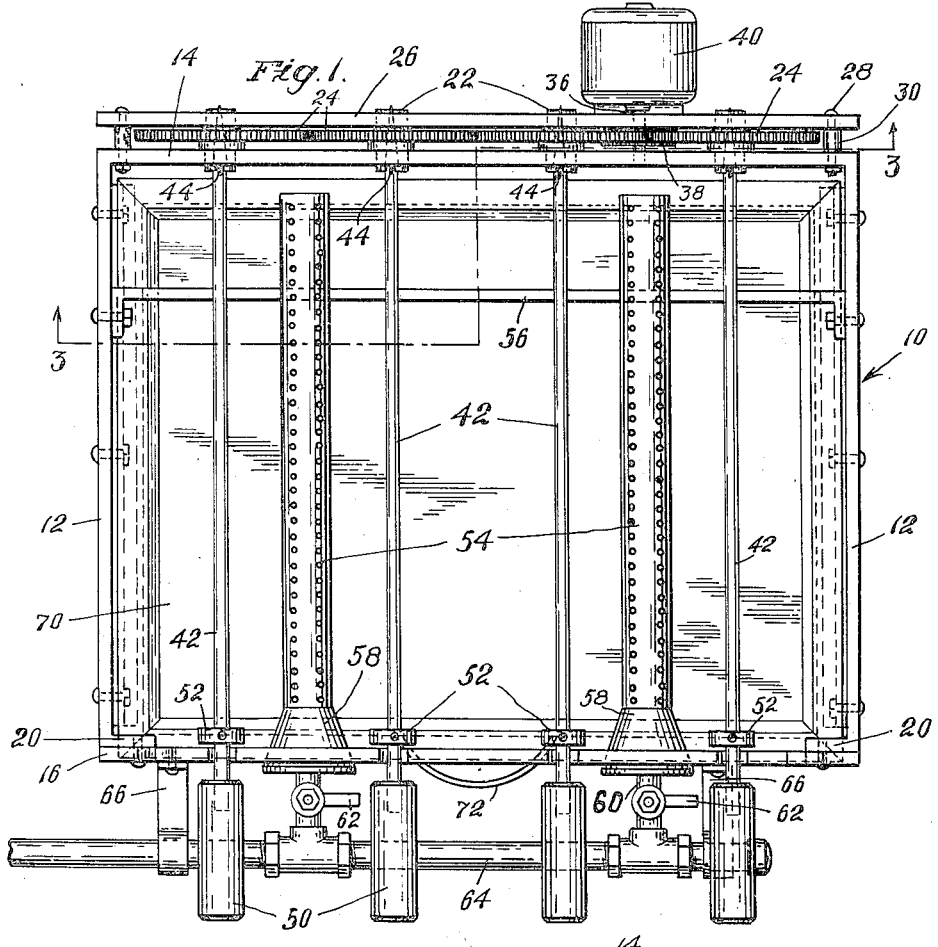
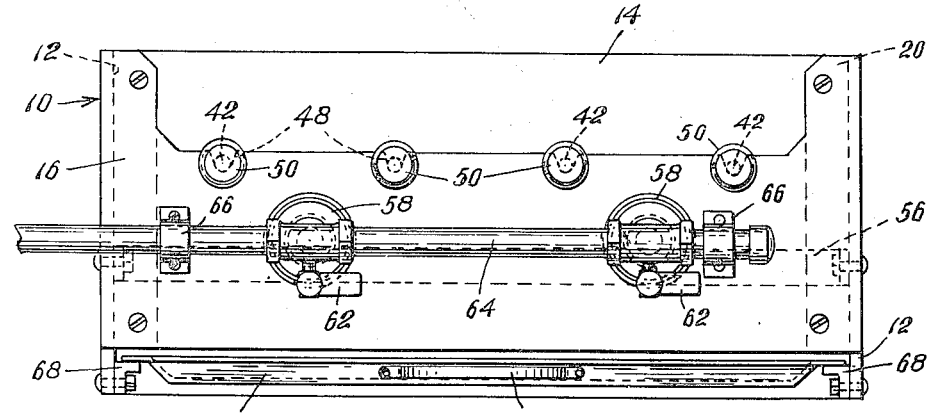
INVENTOR.
DAVID NASSIF
BY
Edgar H. Kent

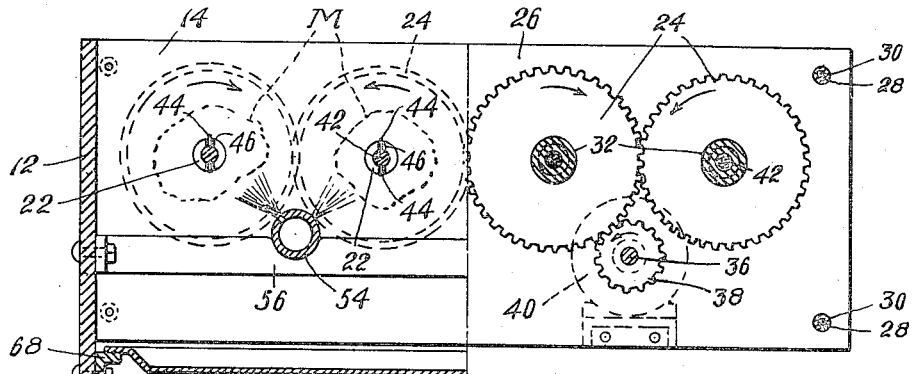
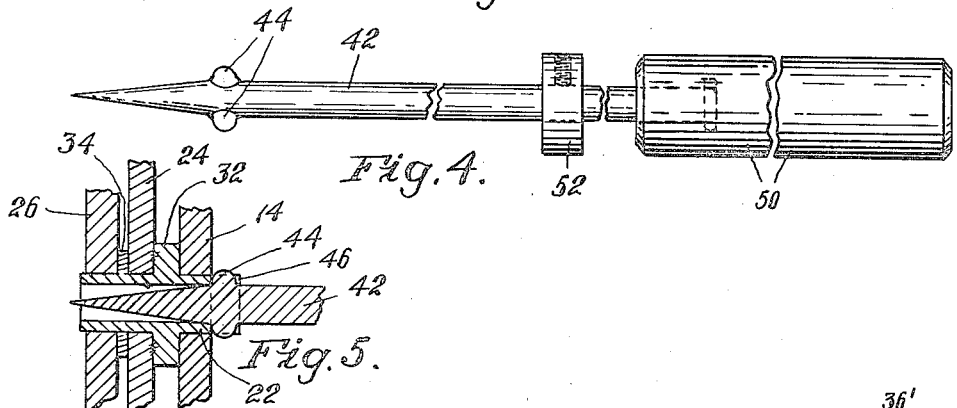
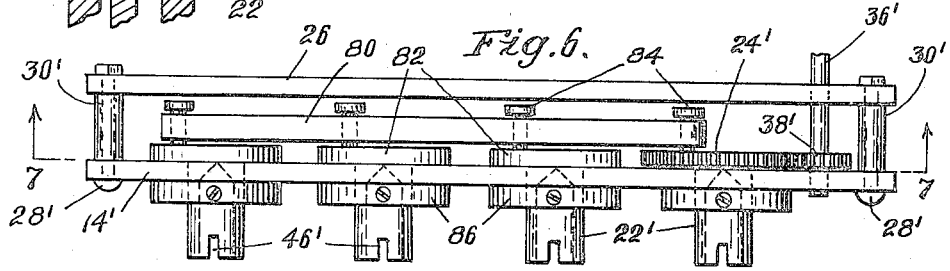
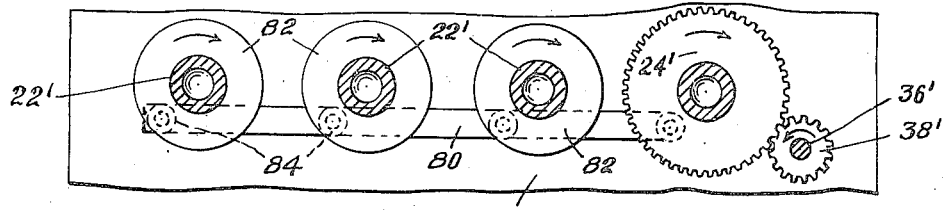

Patented Jan. 10, 1950

2,494,448

UNITED STATES PATENT OFFICE 2,494,448

MACHINE FOR COOKING SKEWERED FOODS

David Nassif, Wilbraham, Mass.

Application February 3, 1945, Serial No. 576,043

3 Claims. (Cl. 99—421)

This invention relates to a machine for cooking skewered foods.

An object of the invention is to provide a machine having removable skewers, on which the food to be cooked, for example, meat for barbecuing, is impaled, and having mechanism for individually rotating said skewers simultaneously during the cooking operation, the skewers being individually engageable with and releasable from the rotating mechanism irrespective of whether or not the latter and the heating means are in operation, and being manipulable by heat-insulated handles which are external to the apparatus during the cooking.

Another object is to provide such a machine having self-contained gas burners by which the cooking is effected, arranged below and between the skewers in a manner to supply cooking heat uniformly and most effectively to the meat or other food on all skewers, but yet out of range of the drippings from the food so that the machine is virtually smoke-free in operation.

A further object is to provide a machine possessing the foregoing features and advantages and which is yet sufficiently compact and inexpensive to be suitable for general household use, as well as for commercial cooking establishments.

In the drawings, which illustrate preferred embodiments:

Fig. 1 is a top plan view and Fig. 2 is a front elevation view of a machine of the invention;

Fig. 3 is a vertical section view taken on the line 3—3 of Fig. 1;

Fig. 4 is a partially broken away side elevation of one of the skewers of the machine;

Fig. 5 is a fragmentary detail section view of one of the skewer rotating mechanisms;

Fig. 6 is a top plan view of a modified skewer rotating mechanism; and

Fig. 7 is a vertical section view on line 7—7 of Fig. 6.

Referring to Figs. 1 to 5 of the drawings, the machine therein shown has a generally rectangular metal frame 10. As shown, the side walls 12 and rear wall 14 of the frame are formed of a single metal strip bent to shape, while the front wall 16 is formed of a separate metal plate bolted to flanges 20 at the front ends of the side walls.

Rotatably journaled through the rear wall 14 of the frame, near the top thereof, are a plurality of short tubes 22, each of which has fastened thereto, outside said wall, a gear 24. The outer ends of said tubes are rotatably received in a cover plate 26, fastened to the rear wall 14 of the frame in spaced relation by bolts 28 and spacers 30, and providing, with the rear wall of the frame, a housing for the gears. As shown in Fig. 5, the gears 24 are welded to a face of an annular flange 32 on the tube 22, said flange and a washer 34 maintaining said gears spaced between wall 14 and plate 26. The gears 24 are all in mesh and they are operated to rotate the tubes 22 simultaneously and uniformly, but successive tubes oppositely, by means of a drive shaft 36 rotatably journaled through plate 26 and in wall 14 having fixed thereto a pinion 38 in mesh with one of the gears 24. As shown, shaft 36 is automatically operated to rotate the gear train 24 by means of an electric motor 40 suitably attached to the cover plate 26.

Tubes 22 form sockets in which are loosely received, from the inner ends thereof, the pointed ends of the skewers 42. The skewers are provided, at the base of their tapered tips, with raised lugs or ears 44 arranged to slidably fit in spaced slots 46, formed in the inner ends of tubes 22, when the skewer tips are fully inserted in the tubes, thus keying the skewers to the tubes for rotation thereby.

The front wall 16 of the frame, which is cut away at the top to about the level of the skewer sockets 22, is provided in its upper edge with notches 48, each notch having a rounded bottom edge aligned with, and approximately at the level of, a corresponding socket 22. Notches 48 form bearings in which the base of a skewer shank is removably received and rotatably supported. The rear end of the skewer shank is provided with a handle 50 of heat insulating flame-resisting material, the shank being of such length that the handle lies outside the front wall 16 of the frame when the skewer is in rotatable engagement with one of the sockets 22 and the skewer shank is received in the corresponding notch 48. Adjacent the handles, the skewer shanks are provided with fixed stops, such as the disks 52, so spaced from the handles as to lie inside the wall 16 when the skewer is operatively associated with the sockets 22 and bearing notches 48. Said stops 52 are so positioned on the skewer shanks that when the ears 44 of the skewers are fully inserted in the key slots 46 the stops are spaced from the inner face of front wall 16 of the frame a distance which is slightly less than the depth to which said ears are engaged within said slots for a reason hereinafter made clear.

Within the frame 10 are located heating elements, shown as V-type gas burners 54. These burners are positioned below the rotatably positioned skewers and extend parallel thereto, with each burner centered below and between a pair of different skewers. The rear ends of the burners are supported on a cross bar 56 bolted to the side walls 12 of the frame. The front ends of the burners include the usual conical throat 58 with air inlet control in which extends and is fastened the gas inlet pipe 60 with hand control valve 62, the throats 58 extending through apertures in front wall 16 of slightly smaller diameter than the outer ends of throats 58. The gas inlet pipes 60 are connected to a supply pipe 64 which may be connected to the gas supply system. The burner and supply pipe assembly is removably fastened to the frame 10 by means of U-shaped brackets 66 bolted to front wall 16 and embracing the pipe 64, and clamping the front rims of the burner throats against said wall about the apertures through which the throats extend.

The side walls 12 of the frame 10 have bolted thereto, near the bottom edge thereof, angle irons 68 forming opposed shelves on which are slidably received the edges of a shallow drip pan 70 provided with a handle 72. The front wall 16 of the frame terminates above the level of the angle irons to provide an opening through which the pan may be inserted into the apparatus, in which position it covers the entire bottom of the frame 10.

In use, the skewers are removed from the machine and the food to be cooked, for example chunks of meat to be barbecued, indicated by the dotted lines M in Fig. 3, is threaded thereon. The tip of the skewer is then inserted in a socket 22 until the ears 44 start to enter the slots 46 and the shank of the skewer, between stop 52 and the handle, is lowered into the bearing notch 48. The skewers can thus be inserted into rotative association with the sockets whether or not the latter are rotating. If the sockets are rotating, the ears are pressed against the end rim of the socket until the latter rotates to a position of registry of the key slots and ears, when the ears enter the slots.

As indicated in Fig. 3, the meat chunks are of lesser diameter than the horizontal spacing between the skewers and the adjacent edge of the associated burner. However, the flame from the burner is directed outwardly and upwardly therefrom at an angle toward the underside of the rotating skewered food. By reason of this arrangement, juices from the food do not strike the burners but fall directly into the pan 70.

The frame as shown is not provided with a cover or smoke venting hood. A cover is undesirable, for reasons later to be explained, and is not needed because the unit is essentially smoke-free. This is due in part to the arrangement of the burners out of the path of the juices dropping from meat or other food and partly to the fact that the frame, open at top and bottom, does not store heat, so that the juices collecting in the drip pan at the bottom are not heated to a temperature at which smoking would occur but are cooled and even congealed. The avoidance of need for a cover or smoke-vented enclosure for the apparatus not only substantially reduces its cost but also simplifies the insertion and removal of the skewers. Furthermore, it is highly desirable to keep the frame open above the burners and skewers so that heat will not be stored within the frame and the heated air may easily escape from the open frame. It should also be noted, at this point, that the side walls 12 of the frame are spaced a considerable distance from the gas burners 54, and that the drip pan 70 is also considerably spaced from the bottom of the burners so as to provide a free circulation of the heated air and escape of the same from the open top so that the cooking of the food on the skewers is accomplished by means of the flame from the gas burners on the surface of the food, rather than by stored and reflected heat.

During the barbecuing operation of the machine, the skewers are rotated at regular uniform speed by the motor 40 and gear operated sockets. The food on each skewer is subject only to the direct heat of its burner which is of advantage not only in controlling and obtaining uniformity of the cooking, but also improves the taste of barbecued meat due to absence of a roasting effect of stored heat. During the operation, the skewers are prevented from accidental dislodgement from operative engagement with the sockets 22 by the stops 52, which are so located as to strike the frame wall 16 and stop endwise withdrawal of the skewer tip from the socket while the ears 44 are still engaged in slots 46. However, when the skewers are withdrawn to this point, there is sufficient play between the reduced tip of the skewer remaining in the socket and the bore of the socket so that the handle end of the skewer can be raised to a point at which the lower edge of stop 52 is above the upper edge of wall 16. Thus the skewer can be completely withdrawn from the socket and removed from the machine when the cooking is completed. Such removal of the skewers may be made without stopping the motor, while the sockets continue to rotate.

Figs. 6 and 7 show a modified form of skewer sockets and drive connections therefor which is efficient and can be made somewhat more cheaply than that of the other figures, corresponding parts being designated by primes of the same reference numerals. In this form, only one of the sockets 22' is provided with a gear 24', this gear being operatively associated with the pinion 38' of drive shaft 36'. The other sockets are rotated therefrom by means of a crank arm 80 pivotally connected to the rear face of gear 24' and to end flanges 82 of the other sockets by pins 84. The sockets 22' are rotatably held in bearing apertures in the rear wall 14' of the frame by means of their end flanges 82, or, in one case, gear 24' at the outside of wall 14', and a ring 86 surrounding the socket and removably fastened thereto at the inside of wall 14'.

As in the other illustrated embodiment, in that of Figs. 6 and 7, the skewers are operatively associated with sockets 22' by inserting their tips therein until ears 44 of the skewers engage in slots 46' of the sockets. The operation differs from the other form, however, in that the sockets 22' are all rotated in the same direction.

If electric current is not available for operation of the motor, it may be replaced by a hand wound, clock spring motor or even a hand crank, although automatic operation is preferable to hand operation not only because hand crank operation is laborious, but also because it is less uniform than automatic operation.

Having shown and described preferred forms of the machine of the invention, what I desire to claim and secure by Letters Patent is:

1. A machine for barbecue cooking having in combination a frame having side walls and open at the top, a food holder, a socket in a wall of said frame for demountably supporting said holder in horizontal position across said frame, means for rotating said holder while positioned in said socket, an elongated gas burner located below and spaced to one side of said holder positioned in said socket, said gas burner being constructed and arranged to throw a flame upwardly and outwardly onto the surface of the food on said holder, said gas burner extending parallel to said holder and exposed thereto and being laterally spaced therefrom to prevent juice from the food on said holder dripping on said burner, and a drip pan positioned below said burner, for collecting the hot juices, a distance sufficient to cool the juices and to prevent smoking thereof, said frame being open above said burner, the side walls of said frame being widely spaced from said burner to provide free circulation and escape of heated air and so that the cooking of the food on said holder by stored and reflected heat is prevented and the cooking is accomplished by means of the flame.

2. A machine for cooking skewered foods having in combination a frame having side walls and open at the top, skewers for supporting food, sockets in opposite walls of said frame for demountably supporting said skewers horizontally across said frame in laterally spaced, parallel relation, means for rotating said skewers while positioned in said sockets, an elongated gas burner located below and between each pair of said skewers positioned in said sockets, said gas burner being constructed and arranged to direct the flame upwardly and outwardly at opposite sides onto the surface of the food on said skewers, said gas burner extending parallel to said skewers and exposed thereto and being laterally spaced therefrom to prevent juice from said food on said skewers dripping on said burner, and a drip pan positioned below said burner, for collecting the hot juices a distance sufficient to cool the juices and prevent smoking thereof, said frame being open above said burners and the side walls thereof being widely spaced from said burners to provide free circulation and escape of the heated air so that the cooking of the food on said skewers by stored and reflected heat is prevented and the cooking is accomplished by means of the flame.

3. A machine as claimed in claim 2 wherein one of said sockets for each skewer is rotatably mounted and the means for rotating said skewers comprises a train of gears having a part connected to each of said rotatable sockets, a drive shaft connected to one of the gears of said train to rotate said train, and means for releasably keying said sockets to said skewers for rotation of said skewers by said sockets.

DAVID NASSIF.

REFERENCES CITED

The following references are of record in the file of this patent:

UNITED STATES PATENTS

| Number | Name | Date |
|---|---|---|
| 463,073 | Noakes | Nov. 10, 1891 |
| 839,236 | Vartanian | Dec. 25, 1906 |
| 1,085,671 | Day | Feb. 3, 1914 |
| 1,134,343 | Mago | Apr. 6, 1915 |
| 1,369,758 | Chippindale | Feb. 22, 1921 |
| 1,704,621 | Matiska | Mar. 5, 1929 |
| 1,718,961 | Humphrey | July 2, 1929 |
| 1,741,781 | Reck | Dec. 31, 1929 |
| 2,020,446 | Weisel | Nov. 12, 1935 |
| 2,125,965 | Sturm | Aug. 9, 1938 |
| 2,245,220 | Nelson | June 10, 1941 |
| 2,263,715 | Bobo | Nov. 25, 1941 |

FOREIGN PATENTS

| Number | Country | Date |
|---|---|---|
| 22,326 | Great Britain | 1905 |